United States Patent [19]
Dailey

[11] Patent Number: 5,511,683
[45] Date of Patent: Apr. 30, 1996

[54] PORTABLE VEHICLE WASH CONTAINMENT LINER SYSTEM

[75] Inventor: Charles M. Dailey, Peoria, Ill.

[73] Assignee: Liqui-Green Lawn Care Corporation, Peoria, Ill.

[21] Appl. No.: 431,144

[22] Filed: Apr. 28, 1995

[51] Int. Cl.⁶ ..................................................... B65F 1/00
[52] U.S. Cl. ............................................................ 220/573
[58] Field of Search ............................ 220/573, 9.1, 4.12; 4/585, 586, 587

[56] References Cited

U.S. PATENT DOCUMENTS

| | | |
|---|---|---|
| 935,278 | 9/1909 | Smyth ...................................... 220/573 |
| 2,757,478 | 8/1956 | Borland . |
| 2,996,150 | 8/1961 | Cassem . |
| 3,661,227 | 5/1972 | Robel et al. . |
| 4,246,982 | 1/1981 | Pretnick . |
| 4,671,024 | 6/1987 | Schumacher . |
| 5,090,588 | 2/1992 | Van Romer et al. . |
| 5,128,189 | 7/1992 | Bartlett . |
| 5,316,175 | 5/1994 | Van Romer ............................. 220/573 |
| 5,329,974 | 7/1994 | Paping ................................... 220/573 |
| 5,423,339 | 6/1995 | Latimer .................................. 220/573 |

FOREIGN PATENT DOCUMENTS 1911939  9/1970  Germany .

Primary Examiner—Joseph M. Moy
Attorney, Agent, or Firm—Ladas & Parry

[57] ABSTRACT

A portable wash containment liner system comprises a flexible floor sheet, four flexible sleeves integrally formed around the periphery of the sheet, resilient solid cores inserted respectively in the sleeves to form two end and two side walls of a rectangular basin, and sealing members formed at the corners of the basin sealing and reinforcing the corners. The floor sheet and the sleeves are made of impervious heavy duty copolymer. Two rigid bars are provided at both sides of one of the end walls to form passing ramps for the vehicle. A paving pad or pads may be provided beneath the floor sheet when the containment liner system is used on a rough ground.

11 Claims, 1 Drawing Sheet

PORTABLE VEHICLE WASH CONTAINMENT LINER SYSTEM

This invention relates to a vehicle wash containment system, particularly to a portable wash containment liner system for lawncare vehicles or the like.

BACKGROUND OF THE INVENTION

Recently, stricter environment protection regulations reflect a growing concern of people with contamination problems in general. Several states in the United States have enacted legislative measures to achieve better environmental protection, such as the Illinois Lawn Care Containment Act. The Act requires wash water containment areas to prevent spills and collect pesticide containing wash water from lawn care vehicles. The Act even specifies the minimum containment volume to be equal to or greater than the volume generated by a 6 inch rain storm. It also requires proper disposal or reuse of the wash liquid. However, not all lawncare operators can afford a permanent containment structure either because of the high cost or lack of available land space. Moreover, certain regulations prohibit or severely limit movement of a possible contaminated vehicle from a location of use to a permanent containment structure located elsewhere. Therefore, a portable wash containment liner system for lawncare vehicles, which is also relatively inexpensive, has become a much needed development.

Prior to this invention, there were a variety of known drainage collectors, disposable drip pans or mats, garage floor liners or foldable spill collectors. However, none of them can satisfy the requirements in the current environmental protection laws, such as the one in Illinois. U.S. Pat. No. 3,661,227 teaches a foldable drainage collection container to be used on the garage floor. It includes a floor sheet with flap extensions to wrap around resilient strips to form curbs of square cross-sections for the container. It cannot effectively prevent spills if the vehicle is driven over the curb while there is a large amount of water in the collector.

U.S. Pat. No. 4,671,024 to Schumacher shows a disposable drip pan of cylindrical curbs without corner sealing members. It cannot contain a relatively large volume of liquid, nor prevent liquid spills when the vehicle passes the curbs. U.S. Pat. No. 5,128,189 to Bartlett discloses a disposable mat with compressible ridge which cannot satisfy the requirements in the environmental protection Acts as well.

U.S. Pat. Nos. 2,996,150; 935,278 and 4,246,982 disclose, respectively, garage floor liners of non-portable structures. U.S. Pat. Nos. 5,316,175 and 5,090,588 teach, respectively, spill containers with high side walls, reinforced by vertical rigid bars at uniform intervals. Such wall structures are not supposed to stand upwardly very stably to hold the liquid of substantial height therein, but to retain a small amount of drainage within the area.

SUMMARY OF THE INVENTION

The object of the present invention is to provide a portable wash containment liner system that satisfies the requirements of various environmental protection laws and regulations.

The containment liner system of the present invention can contain substantial amounts of liquid or fluids having various chemical compositions washed out from lawncare vehicles or drained from any vehicles.

The containment liner system of the present invention can be used on rough ground surfaces, and in different weather conditions.

According to the present invention, a portable wash containment liner system is adapted to prevent spills and containing liquid pesticide residues washed and drained from a vehicle or the like situated therein. The system comprises a flexible floor sheet of impervious heavy duty copolymer; four flexible sleeves integrally formed around the periphery of said floor sheet and formed from the same material of the floor sheet; inflatable/deflatable foam cores of substantially cylindrical shape inserted, respectively, into the sleeves to form two end walls and two side walls defining a rectangular basin; sealing members formed at the four corners of the rectangular basin to provide sealing and extra upstanding strength; and two rigid bars provided at both sides of one of the end walls to form an entry and exit ramp for the vehicle without substantial deformation of said end wall.

DETAILED DESCRIPTION OF THE INVENTION

Figure 1:
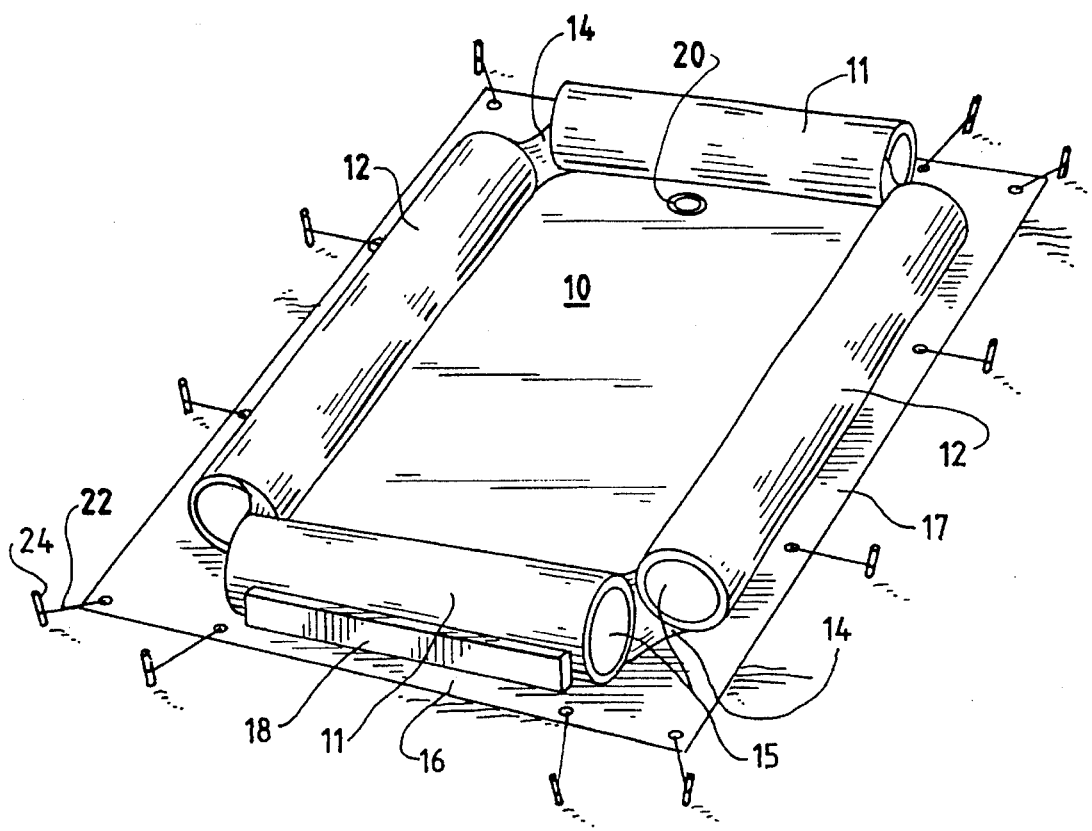
FIG. 1 is a perspective view of the present invention.
Figure 2:
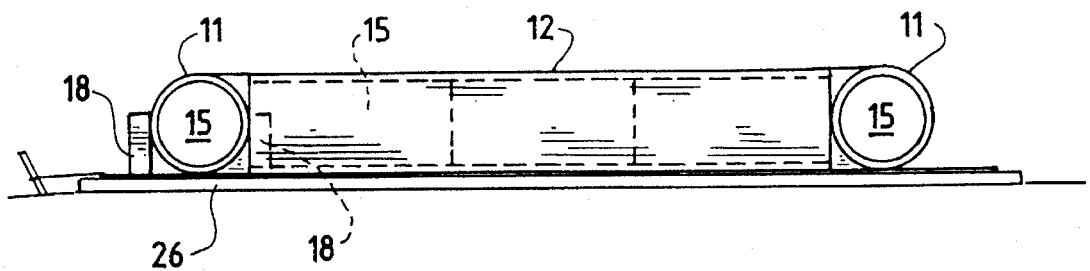
FIG. 2 is a side view of the present invention.

With reference to FIG. 1, the floor sheet 10 is substantially rectangular. The sleeves 11,12 are integrally formed with the floor sheet 10. The floor sheet 10 and the sleeves 11,12 are made of heavy duty copolymer which is flexible and fluid impervious. Heavy duty corner flanges 14 are made of triple ply copolymer for extra strength and are made integral with the sleeves by heat bonding. Inflatable foam core sections 15 are respectively inserted into the sleeves 11,12, and expanded to form solid end and side walls 11,12. After use, core sections 15 are removed so the sleeves and the floor sheet can be rolled together for easy transportation and storage.

In the preferred embodiment, there are integral flange-like extensions 16,17 formed around each side of the floor sheet 10. They are used to be fixed on the ground and to maintain the floor sheet in its selected location under tension. The foam core sections 15 are made of a resilient and deformable material in cylindrical shape which can only be slightly deformed when a vehicle is driven over an end wall. The foam cores 15 are first slightly deflated and then inserted into the sleeves, the sleeves 11,12 constituting two end and two side walls of the rectangular basin. The end and side walls thus assembled are substantially cylindrical.

At each corner of the basin, the three ply weld 14 reinforces the junction of adjacent end and side walls 11,12. The three ply copolymer provides sealing of the corner and extra strength for the upright standing of the end and side walls, and is made of the same material as that of the floor sheet and the integral wall sleeves.

Two rigid removable bars 18 are provided at both sides of and closely adjacent at least one end wall to form a ramp for a vehicle rolling over the end wall without substantial deformation thereof. The bars are made of any rigid material, such as wooden 2×4's. The bars 18 are separate from and need not be connected to the floor sheet 10 and the outer extension of the floor sheet. The bars then can be wrapped in the center of the rolled up floor sheet and the sleeves for transportation and storage.

The floor sheet may include a sump pocket of the same impervious material welded into the bottom at any prescribed area for the collection of the container alternatively contaminated. Alternatively, contaminated liquid contained in the basin can be vacuumed or pumped out by suitable pumping means. Alternatively, a recirculating system can be connected to the spout for recirculating the liquid for reuse. Such a recirculating system is not shown or discussed in detail because any known system can be used for that purpose.

The heavy duty copolymer materials for the floor sheet, the integral wall sleeves and reinforced corners preferably are manufactured from polyvinylchloride (PVC) having a thickness of about 1/16". The material can withstand a wide range of temperatures and is impervious to most common chemicals and wash fluids.

To maintain desired tension in the containment liner system, cords and stakes can be used to pull and fix the extensions. In case of rough ground surfaces an underlying paving layer or pad 26 of about 1/8" or even 1/4" thick PVC can be placed beneath the floor sheet so as to form a smooth foundation for the floor sheet of the containment liner system. The paving pad can be made of polyvinyl chloride or similar materials with strength equal to or greater than the material of the floor sheet.

The wash containment liner system can be assembled together in a very short time, e.g. 15 minutes. It can be placed in the garage or driveway as well as on the grass or rough ground. For grass or rough ground, the paving pad is preferably placed down first. A typical size of the containment liner system is about 10'×22'×8¼" which can accommodate a typical lawn spray vehicle. The volume of the containment can be up to 1,400 gallons for the typical size. However, any desirable size of the containment liner system may be adopted for different vehicles.

I claim:

1. A portable wash containment liner system for preventing spills and containing liquid pesticide residues washed and drained from a vehicle situated therein, said system comprising a flexible floor sheet of impervious heavy duty copolymer; four flexible sleeves integrally formed around the periphery of said floor sheet and formed from the same material of the floor sheet; removable resilient solid foam cores of substantially cylindrical shape inserted respectively into the sleeves to form two end and two side walls of a rectangular basin of the system; sealing members formed at the junction of each side and end wall of the rectangular basin to provide sealing and extra upstanding strength; and two rigid bars provided at both sides of one of the end walls to form passing ramps for the vehicle.

2. The system of claim 1, wherein said copolymer of the floor sheet and the sleeves consists essentially of polyvinylchloride.

3. The system of claim 1, further comprising a paving layer provided beneath the floor sheet, said paving layer being of strength equal to or greater than that of the floor sheet.

4. The system of claim 3, wherein said paving layer is made of polyvinyl chloride.

5. The system of claim 1, wherein a spout is formed on the floor sheet for discharging the liquid residues therefrom into an adjacent vessel.

6. The system of claim 1, wherein a recirculating device is connected to an opening formed on the floor sheet for recirculating the liquid for reuse.

7. A portable wash containment system adapted to facilitate clean up of chemical spraying equipment on vehicles, comprising in combination, a generally rectangular liquid retention basin assembly having a flat rectangular floor made of a liquid impervious flexible material, integral side and end walls also made of liquid impervious material, said side and end walls being generally hollow cylindrical members with removable cylindrically shaped foam inserts contained in sleeve elements, reinforced integral corner areas at the juncture of each respective side and end wall, a pair of elongated reinforcement means positioned adjacent the inside and outside of at least one end wall to facilitate entry into and exit from said retention basin by a vehicle, without substantially deforming said end wall, said containment system being portable upon disassembly after cleanup of wash materials therefrom.

8. A system according to claim 7, wherein said removable cylindrically shaped foam inserts are capable of being contracted for insertion and withdrawal, and expanded to fill the hollow cylindrical members in use.

9. A system according to claim 9, including integral flange-like extensions of said flat rectangular floor extending outwardly beyond said side and end walls, and having means to facilitate securement of said integral extensions to the ground or other support surface whereby to maintain the basin assembly under a selected degree of tension in use.

10. A system according to any preceding claim wherein said retention basin including said floor, said side and end walls and said corner areas are formed of a heavy duty fluid impervious copolymer material.

11. A system according to claim 7, wherein said pair of elongated reinforcement means are wedged against the inside and outside lower regions of at least one cylindrical end wall to substantially prevent deformation of said end wall in use while permitting a motor vehicle to pass thereover.

* * * * *